United States Patent [19]

Brumfield

[11] 4,252,765
[45] Feb. 24, 1981

[54] METHOD FOR FABRICATING WOUND HOLLOW FIBER DIALYSIS CARTRIDGES

[76] Inventor: Robert C. Brumfield, P.O. Dr. CC, Lakeshore Ter., Incline Village, Nev. 89450

[21] Appl. No.: 112,619

[22] Filed: Jan. 16, 1980

Related U.S. Application Data

[63] Continuation of Ser. No. 893,081, Mar. 3, 1978, abandoned.

[51] Int. Cl.³ .............................................. B29C 17/10
[52] U.S. Cl. ................. 264/157; 210/321.3; 264/233; 264/261; 264/279
[58] Field of Search ................... 210/22, 32 R, 321 A, 210/321 B; 264/263, 265, 271, 138, 157, 233, 261, 340, 279; 134/117, 137, 201, 14, 22 R, 22 C

[56] References Cited

U.S. PATENT DOCUMENTS

| | | | |
|---|---|---|---|
| 3,422,008 | 1/1969 | McLain | 210/22 |
| 3,704,223 | 11/1972 | Dietzsch et al. | 210/22 |
| 3,730,959 | 5/1973 | Horres, Jr. et al. | 264/263 |
| 3,932,570 | 1/1976 | Cox et al. | 264/69 |

Primary Examiner—Ernest G. Therkorn
Assistant Examiner—David R. Sadowski
Attorney, Agent, or Firm—Phillips, Moore, Weissenberger, Lempio & Majestic

[57] ABSTRACT

In the manufacture of wound hollow fiber dialysis cartridges, rigid preliminary tube sheets are formed near each end of the winding, outwardly of the area of the winding which will ultimately be used in finished cartridges. The preliminary tube sheets are then cut transversely to the winding mandrel to expose the hollow fiber ends. The cut preliminary tube sheets, mandrel, and fibers now form a unitary structure which can be washed and treated to make the fiber surface easily adherable to the potting material from which the permanent tube sheets are thereafter formed. After forming the permanent tube sheet, the winding is cut into individual cartridges, and the preliminary tube sheets are discarded.

3 Claims, 2 Drawing Figures

METHOD FOR FABRICATING WOUND HOLLOW FIBER DIALYSIS CARTRIDGES

CROSS-REFERENCE TO RELATED APPLICATION

This application is a continuation of my copending application Ser. No. 893,081, filed Mar. 3, 1978, entitled HOLLOW FIBER TREATMENT, now abandoned.

BACKGROUND OF THE INVENTION

U.S. Pat. No. 3,422,008 to McLain shows a method of manufacturing blood dialyzers by winding hollow fibers onto a mandrel. In the McLain patent, the fibers are wound on a rather long mandrel and are provided with tube sheets of epoxy which secure the fibers together at intervals along the mandrel. The tube sheets are subsequently cut in half, transversely to the mandrel, to form individual cartridges in conjunction with the mandrel and fibers.

In the bulk stage, the hollow fibers used in the construction of these blood dialyzers are partially filled, and their walls are saturated, with an organic oil as a consequence of manufacture. This oil reduces the adhesion of the hollow fibers to the tube sheets and is prone to result in leakage. The oil must also be removed from the interior of the fibers before the dialyzer is used.

It is thus desirable to wash the fibers after winding and before the permanent tube sheets are applied as shown in McLain. In the absence of the tube sheets, however, the fibers have no structural integrity and cannot be easily handled.

SUMMARY OF THE INVENTION

The present invention overcomes this dilemma by potting the hollow fiber winding with preliminary tube sheets (which are subsequently discarded) and one or both ends of the winding axially spaced outside the eventual location of permanent tube sheets. The preliminary tube sheets, in conjunction with the mandrel, form a rigid structure which allows the fiber winding to be handled without damage. By cutting off the ends of the winding outside of the preliminary tube sheets, access to the interior of the fibers for washing purposes is provided at the cut face of the preliminary tube sheets. It is thus possible to handle a multiple-cartridge-length winding like a finished piece, and with the advantage that the hollow fiber surface and the interior of the fibers are all accessible to cleaning operations, including the areas where permanent tube sheets are eventually to be formed. In addition, the entire inner and outer surfaces are thus exposed for leak testing.

DETAILED DESCRIPTION OF THE INVENTION

Figure 1:
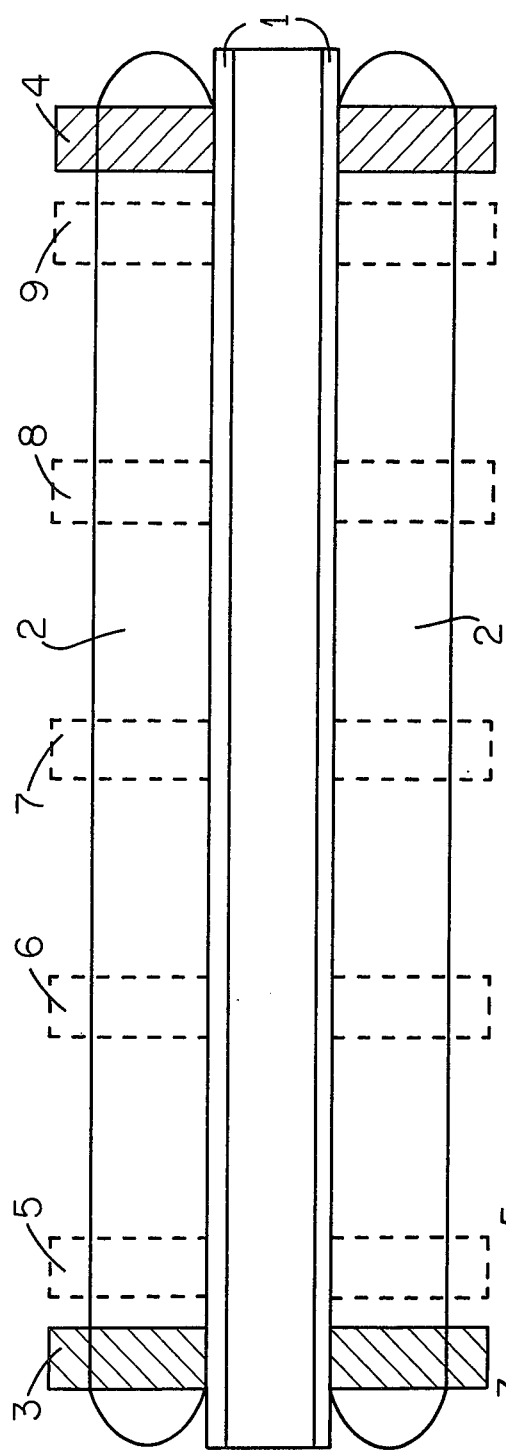
FIG. 1 is a schematic longitudinal section of a wound hollow fiber dialysis cartridge illustrating the preliminary tube sheets of the invention.
Figure 2:
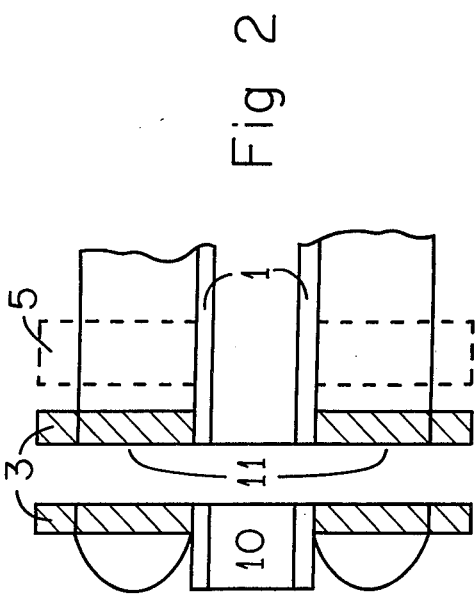
FIG. 2 is a partial section similar to FIG. 1 but showing the cutting and removal of the fiber winding ends.

FIG. 1 illustrates the structure of this invention. 1 is the support core or mandrel. 2 is the hollow fiber winding. 3 and 4 are the preliminary epoxy tube sheets (applied as described in the above-identified McLain patent) at the extremities of the hollow fiber winding. The preliminary tube sheets are cut through, as shown in FIG. 2, to remove the winding ends 10. 5 and 9 designate the eventual locations of the outer permanent tube sheets, and 6,7,8 are representative eventual locations of intermediate permanent tube sheets if multiple unit windings are employed. In FIG. 2, 11 is the cut and machined surface of one of the preliminary tube sheets, after removal of the winding end, through which the interior of the hollow fibers can be accessed.

The fiber winding 2, together with the cut-off preliminary tube sheets 3,4 in connection with the support core or mandrel 1 to which they are bonded, forms a stable unitary structure with all of the eventually used hollow fiber surfaces exposed for treatment and test. After the fiber winding 2 has been washed and tested, the permanent tube sheets 5 through 9 are placed as described by McLain, and the winding sections containing the preliminary tube sheets are cut away and discarded.

The present process makes all of the hollow fiber area which will eventually be used available for treatment and test in a stable structural form. If desired, the preliminary tube sheet can be applied to one end only and cut through, or preliminary tube sheets can be applied to both ends and only one cut through. It is possible, if desired, to establish as many preliminary tube sheets for test and treatment as required by so placing these preliminary tube sheets in areas of the winding which will not be used in the finished product.

I claim:

1. A method of fabricating dialysis cartridges using hollow permeable fibers wound on a mandrel to which they are secured by rigid tube sheets, comprising the steps of:
   a. forming, in an area of said fiber winding which is not to be used in the finished cartridges, a preliminary tube sheet to secure said fibers with respect to said mandrel;
   b. treating said fiber winding thus secured to said mandrel for removal of manufacturing oils;
   c. forming, in treated areas of said fiber winding, permanent tube sheets defining individual cartridges;
   d. cutting said permanent tube sheets to form individual cartridges; and
   e. discarding said preliminary tube sheets.

2. The method of claim 1, further comprising the step of cutting said preliminary tube sheet prior to said treatment to expose the interior of said hollow fibers.

3. The method of claim 1, in which preliminary tube sheets are formed at each end of said winding outwardly of the area to be used in the finished cartridges.

* * * * *